1

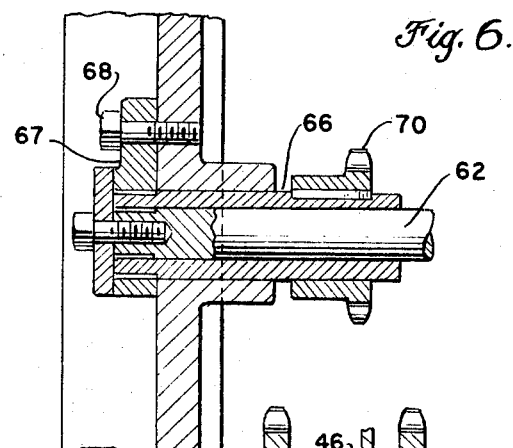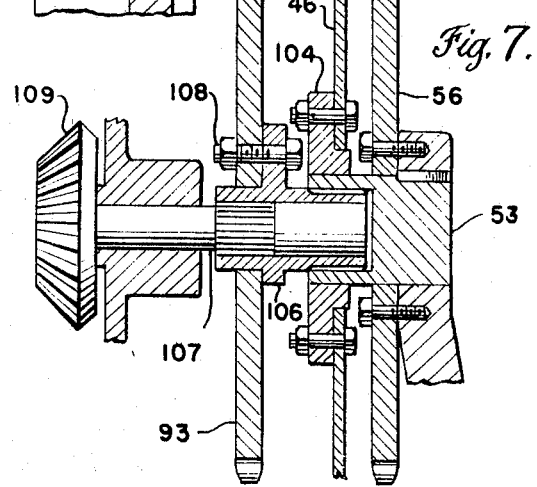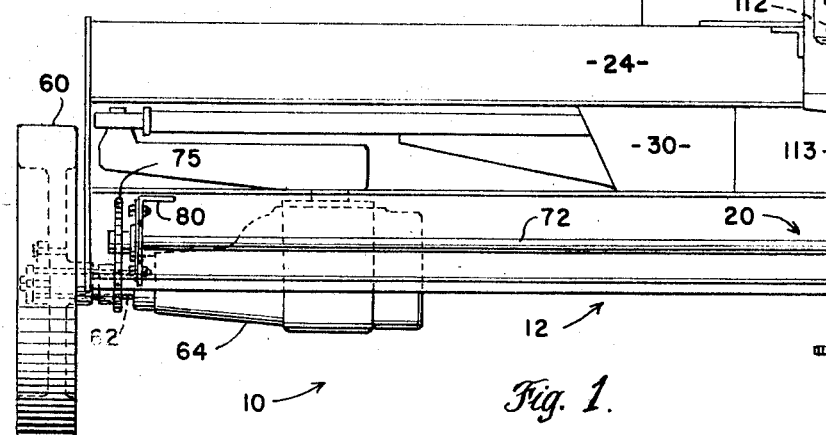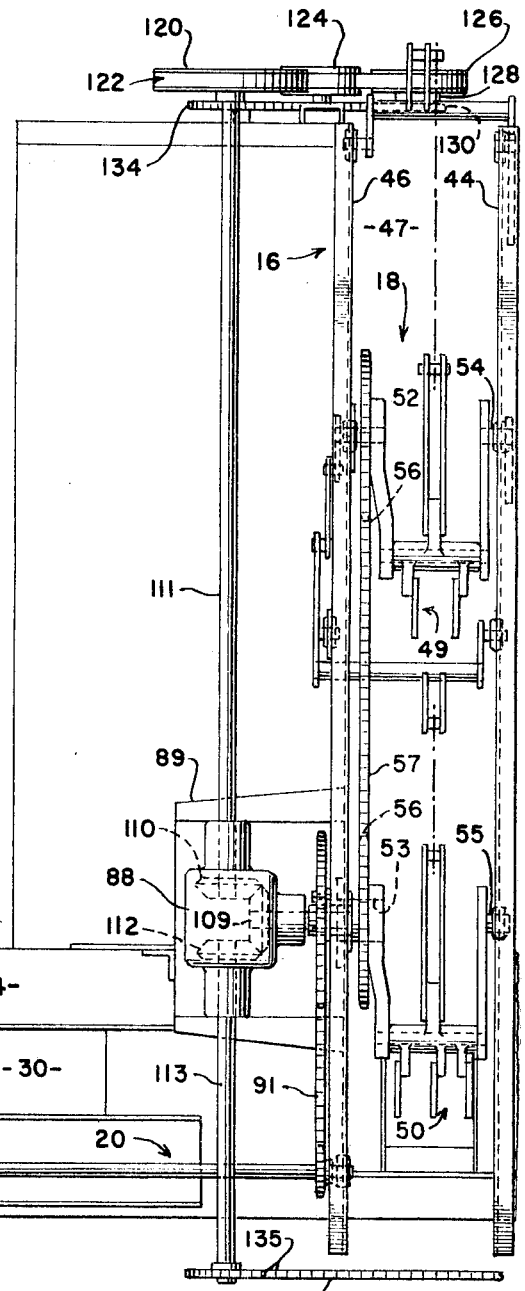
Fig. 6.
Fig. 7.
Fig. 1.
INVENTORS
JAMES H. HOLLYDAY
& HOWARD J. HULLINGER
BY Donald D. Schaper
ATTORNEY May 26, 1970  J. H. HOLLYDAY ET AL  3,513,651
BALER WITH PLUNGER DRIVE SEPARATE FROM PICKUP AND FEEDER DRIVES
Filed July 17, 1967  2 Sheets-Sheet 2
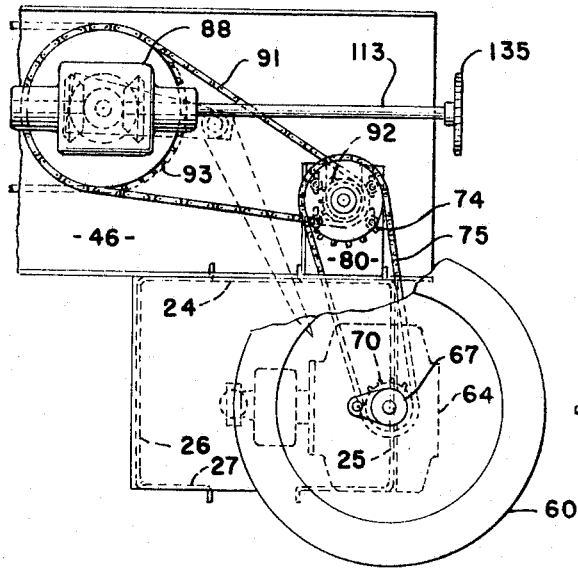
Fig. 3.
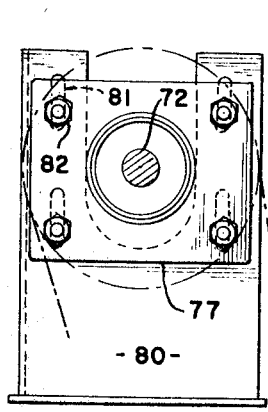
Fig. 4.
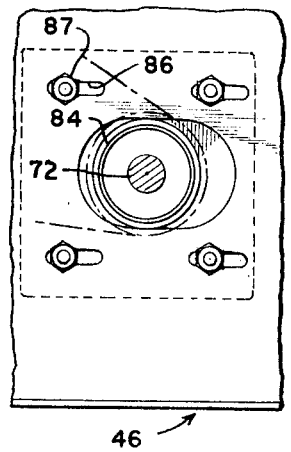
Fig. 5.
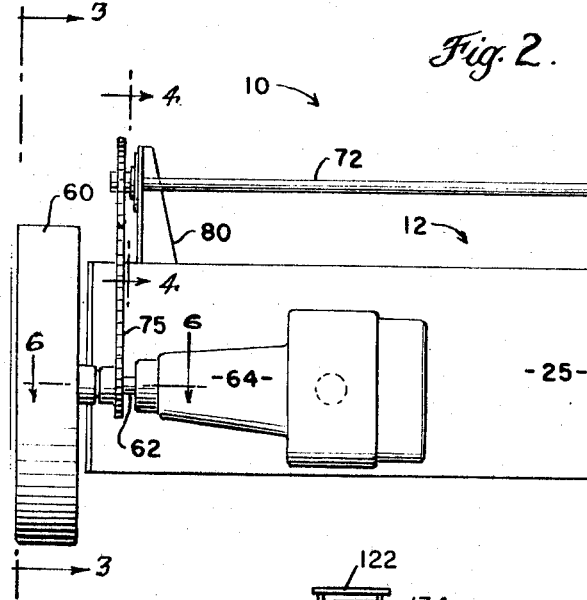
Fig. 2.
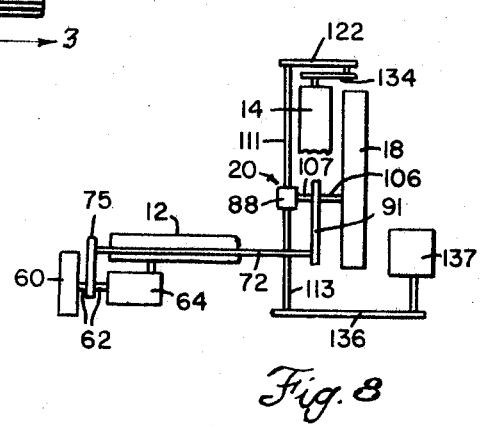
Fig. 8
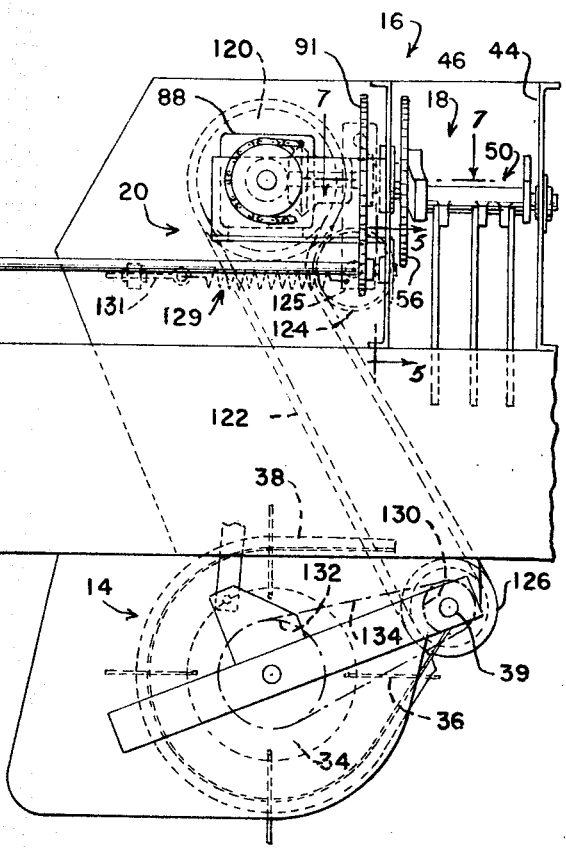
INVENTORS
JAMES H. HOLLYDAY
& HOWARD J. HULLINGER
BY Donald D. Schaper
ATTORNEY United States Patent Office
3,513,651
Patented May 26, 1970

3,513,651
BALER WITH PLUNGER DRIVE SEPARATE FROM
PICKUP AND FEEDER DRIVES
James H. Hollyday, New Holland, and Howard J.
Hullinger, Ephrata, Pa., assignors to Sperry Rand
Corporation, New Holland, Pa., a corporation of
Delaware
Filed July 17, 1967, Ser. No. 653,833
Int. Cl. A01d 39/00
U.S. Cl. 56—343                                    10 Claims

ABSTRACT OF THE DISCLOSURE

The baler drive comprises a (first) plunger gearbox connected at the front of the baler connected by a short shaft to the flywheel and a (second) pickup and knotter gearbox by the bale case in front of the feed chamber. The second gearbox is driven by rearwardly extending drive shaft coupled to the short shaft at the front and to the second gearbox by a transversely extending chain and sprocket drive. The pickup is connected to the second gearbox by a chain and sprocket drive, a belt and pulley drive on the outboard side and a first cross shaft extending transversely from the outboard side to the second gearbox. A second cross shaft extends from the other side of the second gearbox to a knotter chain and sprocket drive. The feeder is driven by a transversely extending chain and sprocket drive within the feeder through the second gearbox chain and sprocket drive and the rearwardly extending drive shaft.

Background of the invention

This invention relates generally to balers, and more specifically, to an improved drive system in a pickup baler.

It is common to supply power to the baler through a power shaft having a forward end connected to the tractor power take-off and a rear end connected to the baler flywheel. From the flywheel, power is transferred rearwardly to drive a rotatable pickup which picks crop material off the ground and delivers it to a feed chamber, a feeder which operates in the feed chamber for conveying crop material into the bale case, a reciprocating plunger which operates in the bale case to compress the material, and knotters for tying wire or string to secure the crop material in a compressed form. Various drive systems have been used in pickup balers to deliver power to the baler components.

One of the main objectives in the design of baler drive systems is to provide a drive system which can be economically manufactured and which will function efficiently with a minimum loss of power. In conventional baler drive systems, power is transferred through the forward baler components to drive the rear components. One of the disadvantages in this type of drive system is that the forward components must be made large enough to withstand the additional loads which result from the power carried for the rear components. Further, when all the drives of the various components are connected together, it is difficult to regulate the speeds of the components so that they work in timed relationship to each other.

Summary of the invention

In the baler drive system of the present invention, a relatively short connecting shaft transmits power from the flywheel to a plunger gearbox located on a side of the bale case at the forward end of the baler. A reciprocating plunger is driven from a crank connected to the output shaft of the plunger gearbox. A chain drive connects a longitudinally extending main drive shaft on the top wall of the bale case to the connecting shaft.

2

The main drive shaft furnishes power to the rotatable pickup, feeder, and knotters. The drive shaft is operatively connected to a component gearbox located on the forward wall of the feed chamber and to the fedeer drive system. A first cross shaft extends from one side of the component gearbox to the outboard side of the machine where it is connected to the pickup drive. A second cross shaft extends from an opposite side of the gearbox and is connected to the knotters through a chain drive.

A principal object of this invention is to provide a drive system in a pickup baler of the type described in which a substantial reduction is achieved in the weight and cost of the drive system through a novel distribution of the drive components.

Another object of this invention is to provide a consolidated drive system for a rotatable pickup, a feeder, and knotters in a pickup baler of the type described.

Another object of this invention is to provide a baler drive system which is readily accessible for maintenance and repair.

A further object of this invention is to provide a belt drive for a rotatable pickup in which the belt serves as a slip clutch and as an overrunning clutch.

A still further object of this invention is to provide a longitudinally extending drive shaft for the baler components which is adjustable both horizontally and vertically.

Other objects and advantages of this invention will be apparent hereinafter from the specification and from the recital in the appended claims.

Brief description of the drawings

FIG. 1 is a plan view of a baler and showing the baler component drive system.

FIG. 2 is a side elevational view of the baler, as shown in FIG. 1.

FIG. 3 is an end elevational view, taken as indicated by the arrows 3—3 in FIG. 2.

FIG. 4 is an enlarged detailed view of the front mounting bracket for the drive shaft, taken as indicated by the line 4—4 in FIG. 2, and showing the vertical adjustment means for the drive shaft.

FIG. 5 is an enlarged detailed view of the mounting in the feed chamber wall for the rear end of the drive shaft, taken as indicated by the line 5—5 in FIG. 2, and showing the horizontal adjustment means.

FIG. 6 is an enlarged section, taken on the line 6—6 of FIG. 2, and showing the connections between the flywheel and the elements driven thereby.

FIG. 7 is an enlarged section taken on the line 7—7 of FIG. 2 and illustrating the connections between the component gearbox and the feeder.

FIG. 8 is a diagrammatic representation of the drives.

Description of the preferred embodiment

Referring now to the drawings by numerals of reference and particularly to FIGS. 1 and 2, the numeral 10 designates a portion of a hay baler which includes a fore-and-aft extending bale case 12, a rotatable pickup 14 mounted adjacent the bale case along one side of the baler, referred to as the inboard side, and extending to the opposite side of the baler, referred to as the outboard side. A feed chamber 16 and feeder are mounted rearwardly of pickup 14 and extend perpendicular to the bale case. The feeder 18 is operable in the feed chamber to move material across the chamber and into the bale case. Rotatable pickup 14, feeder 18, and a tying means, not shown, are driven by a drive system 20 which will be more fully described hereinafter. The described baler structure is mounted on a wheel-supported frame, not shown, for movement through a field.

Bale case 12 comprises a top wall 24, side walls 25 and 26, and a bottom wall 27. A plunger 30 is reciprocably mounted in bale case 12 and is adapted to move crop material rearwardly in the bale case and compress it into bales.

Rotatable pickup 14, as shown in FIG. 2, comprises a reel 34 having circumferentially spaced rows of radially projecting pickup fingers 36. The pickup fingers 36 are separated by laterally spaced stripper members 38. The pickup is supported for pivotal movement about a shaft 39 connected to the baler frame, not shown.

Feed chamber 16 is located rearwardly of rotatable pickup 14 and comprises a rear wall 44, a forward wall 46, and a floor, or platform, 47.

Feeder 18 is operable in feed chamber 16 for moving the crop material across platform 47 and into the bale case 12. With reference to FIG. 1, feeder 18 comprises a pair of feed finger assemblies 49 and 50. Feed finger assembly 49 is mounted on crank shafts 52 and 54 journalled respectively in walls 46 and 44 of feed chamber 16. Feed finger assembly 50 is carried on a crank shaft 53 journalled in forward wall 46 and a crank shaft 55 journalled in rear wall 44. Drive sprockets 56 are carried on crank shafts 52 and 53 and are operatively connected by a drive chain 57. It will be seen that as sprockets 56 are rotated by the drive system, the finger assemblies will orbit about the axes of the crank shafts in a well known manner to move the crop material across platform 47.

Baler flywheel 60 is driven by a power shaft, not shown, connected by the tractor power take-off. A connecting shaft 62 extends rearwardly from flywheel 60 to a gearbox 64 mounted in side wall 25 of the bale case. As shown in FIG. 6, shaft 62 is connected to a sleeve 66 by means of splines, and sleeve 66 is fixed to a shear hub 67 which is connected to a flywheel 60 by a shear bolt 68. A sprocket 70 carried on sleeve 66 furnishes power to a longitudinally extending main drive shaft 72 through a sprocket 74 on shaft 72 and a connecting chain 75.

Main drive shaft 72 is journalled at its forward end in a bearing 77 mounted on a forward mounting bracket 80. Bearing 77 can be adjusted in a vertical direction by means of slots 81 and fasteners 82 (see FIG. 4). At its rear end, drive shaft 72 is carried in a bearing 84 which is mounted in wall 46 of the feed chamber. As shown in FIG. 5, bearing 84 can be adjusted laterally relative to bracket 85 by means of slots 86 and fasteners 87. The vertical and horizontal adjustments for shaft 72 eliminate the need for idler sprockets on the chains connected to shaft 72.

As shown in FIGS. 1 and 7, power is transferred from drive shaft 72 laterally to a components gearbox 88 carried on a mounting bracket 89 fixed to the forward wall 46 of the feed chamber. A drive chain 91 extends around a sprocket 92 on shaft 72 and a sprocket 93 operatively connected to gearbox 88.

As shown in FIG. 7, feeder drive sprocket 56 is carried on crank shaft 53 journalled in a bearing 104 fixed to feed chamber wall 46 and connected to a sleeve 106 by means of splines. Sleeve 106 receives a stub shaft 107 which is held therein against rotation. Sprocket 93 is connected to a collar on sleeve 106 by a shear bolt 108. Shaft 107 extends into gearbox 88 and carries a bevel gear 109 which meshes with a first gear 110 on cross shaft 111 and a second gear 112 on a second cross shaft 113.

Pickup 14 is driven from a drive pulley 120 on the outboard end of cross shaft 111. As shown in FIGS. 1 and 2, a belt 122 extends around pulley 120, past an idler pulley 124 carried on a pivotally mounted arm 125, and around a pulley 126 fixed to a stub shaft 128 journalled in a pickup frame member, not shown. A spring 129 biases idler pulley 124 against belt 122, and the tension in spring 129 is regulated by an eyebolt 131. Shaft 128 also carries a sprocket 130 which is drivingly connnected to a pickup drive sprocket 132 through a chain 134.

The amount of power transmitted by belt 122 is determined by the force applied to the belt by the spring 129 acting through idler pulley 124. If pickup 14 should be stopped by an obstruction in the field, belt 122 will slip on pulley 126 to prevent damage to the drive elements. Also, if it becomes necessary to reverse the drive to clean out the baler, or for other reasons, belt 122 will slip relative to pulley 126 so that there is no damage. Thus, the effects of both a slip clutch and an overrunning clutch are provided by the arrangement of the pulleys and belt in the pickup drive.

A second cross shaft 113 is adapted to furnish power to the baler knotters 137 through a sprocket 135 and a chain 136.

In operation, power is supplied to baler flywheel 60 through the P.T.O. shaft of the tractor, not shown. From the flywheel, power is transferred to gearbox 64 for driving plunger 30 and to drive shaft 72 to drive the other baler components. Drive shaft 72 is operatively connected to gearbox 88 and feeder 18. Power is supplied to the rotatable pickup through cross shaft 111 and to the knotters, not shown, through cross shaft 113.

An important feature of the disclosed invention is the novel distribution of the components in the drive system so that the power carried by some of the components is reduced, thereby facilitating the use of lighter components. The drive to the baler plunger, and the drive to the pickup, feeder, and knotters, are independent systems. A further division takes place at gearbox 88 where power is transferred to the pickup and to the knotters through separate drive systems.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:
1. In a baler:
a bale case extending generally in a fore-and-aft direction and having an upright side wall with a feed opening therein;
a feed chamber extending laterally from said bale case, said feed chamber being in communication with said feed opening and having an outboard end spaced laterally from said upright side wall;
a pickup mounted in front of said feed chamber and supported for rotation about a transverse axis, said pickup having crop engaging means which are adapted to direct crop material to said feed chamber, said pickup having an inboard side adjacent said bale case and an outboard side spaced laterally therefrom;
a feeder operable in said feed chamber, said feeder including a feed finger assembly mounted in said chamber for movement about an axis generally parallel to said bale case direction for conveying crop material received from said pickup through said feed opening and into said bale case;
a plunger reciprocal in said bale case from a position forward of said feed opening to a position rearward thereof;
a first gearbox on a forward end of said bale case and means connecting said gearbox and plunger for driving said plunger;
a flywheel mounted on said bale case and forwardly of said gearbox, said flywheel having means for connection to a power source;
a connecting shaft extending between said flywheel and said first gearbox;
a main drive shaft journalled on said bale case and extending from adjacent said gearbox rearwardly to a position adjacent said feeder;

a first means connecting said main drive shaft to said feeder;

a second means connecting said first means to said pickup; and means for coupling said main drive shaft to said connecting shaft to drive said pickup and said feeder directly from said flywheel through said first and second means respectively while said plunger is driven separately through said gearbox.

2. A baler, as recited in claim 1, wherein said second means comprises a second gearbox mounted adjacent said feeder and said bale case, a stub shaft extending rearwardly from said second gearbox and said first means includes a first sprocket mounted on said stub shaft, a second sprocket mounted on said main shaft adjacent said feeder, and an endless chain connecting said first sprocket to said second sprocket on said main drive shaft.

3. A baler, as recited in claim 2, wherein said second means comprises a first cross shaft which extends from said second gearbox to said outboard side of said pickup, and means are provided for connecting the outboard end of said cross shaft to said pickup at said outboard side thereof.

4. A baler, as recited in claim 3, wherein a second cross shaft extends from said second gearbox in a direction opposite to said first cross shaft and generally in line therewith, and a chain drive is connected to said second cross shaft for driving a knotter.

5. In a baler:

a bale case extending generally in a fore-and-aft direction along a fore-and-aft axis and having a forward end and a top wall;

a pickup and a feeder with a feeder chamber including a forward wall extending generally normal to one side of said bale case for providing cut crop material to said bale case, said feeder including a feeder finger assembly mounted in said chamber for movement about an axis generally parallel to said fore and aft axis;

a flywheel fixed to said forward end of said bale case and adapted to rotate about a generally horizontal fore-and-aft axis;

a plunger gearbox fixed to said bale case rearwardly of said flywheel;

a connecting shaft extending between said flywheel and said plunger gearbox for transferring power from said flywheel to said plunger gearbox;

a longitudinally extending drive shaft mounted on said top wall of said bale case, said drive shaft having a forward end and a rear end and drive means connected to the pickup and feeder; and means for connecting said connecting shaft to said drive shaft at said forward end for separate delivery of input to said pickup and feeder from delivery of input to said plunger gearbox.

6. In a baler, as recited in claim 5, wherein a first bracket is mounted on said bale case top wall at the forward end of the bale case and said bracket carries a forward end of said drive shaft, said forward feed chamber wall extends over said bale case, said drive shaft is journalled in said wall, and means for adjustably mounting said drive shaft relative to said first bracket and to said wall.

7. In a baler, as recited in claim 5, wherein said drive means includes a second gearbox mounted on said forward wall of said feed chamber, said drive shaft is operatively connected to said second gearbox, and said second gearbox having means to transfer power to said pickup and to knotters mounted on said bale case.

8. In a baler, as recited in claim 5, wherein said pickup has a rotatably mounted reel extending generally perpendicular to said bale case, an inboard side adjacent said bale case and an outboard side spaced laterally therefrom, and said drive means includes pickup drive means on said outboard side of said pickup and transverse drive means extending along said pickup and coupled to said drive shaft.

9. In a baler, as recite in claim 7, wherein said feeder is operable rearwardly of said forward feed chamber wall, and said drive means includes means connecting said feeder to said drive shaft.

10. In a baler, as recited in claim 7, wherein knotters are provided on said bale case and said drive means includes a pair of cross shafts extending from opposite sides of said second gearbox, with one of said cross shafts connected to said rotatable pickup and the other of said cross shafts is adapted to drive said knotters.

References Cited

UNITED STATES PATENTS

| | | | |
|---|---|---|---|
| 2,843,989 | 7/1958 | McClellan | 56—341 X |
| 3,249,040 | 5/1966 | Van Der Lely | 100—179 |
| 3,464,346 | 9/1969 | Crane et al. | 100—189 X |

FOREIGN PATENTS

| | | |
|---|---|---|
| 1,212,765 | 4/1966 | Germany. |
| 993,841 | 6/1965 | Great Britain. |

OTHER REFERENCES

Holland: New Holland Machine Co., (Sperry Rand), New Holland, Pa., brochure entitled "Compact Hayliner 65," copyright 1960.

F. BARRY SHAY, Primary Examiner

U.S. Cl. X.R.

100—189